(12) United States Patent
Klaghofer et al.

(10) Patent No.: US 10,666,736 B2
(45) Date of Patent: May 26, 2020

(54) COMPUTER-IMPLEMENTED METHOD AND SYSTEM FOR MANAGING TENANTS ON A MULTI-TENANT SIP SERVER SYSTEM

(71) Applicant: Unify Patente GmbH & Co. KG, Munich (DE)

(72) Inventors: Karl Klaghofer, Munich (DE); Johannes Ruetschi, Boca Raton, FL (US); Stefan Ried, Ladenburg (DE)

(73) Assignee: Unify Patente GmbH & Co. KG, Munich (DE)

( * ) Notice: Subject to any disclaimer, the term of this patent is extended or adjusted under 35 U.S.C. 154(b) by 200 days.

(21) Appl. No.: 15/865,635

(22) Filed: Jan. 9, 2018

(65) Prior Publication Data

US 2018/0198868 A1      Jul. 12, 2018

Related U.S. Application Data

(60) Provisional application No. 62/444,512, filed on Jan. 10, 2017.

(51) Int. Cl.
*H04L 29/08* (2006.01)
*H04L 29/06* (2006.01)
(Continued)

(52) U.S. Cl.
CPC ............ *H04L 67/14* (2013.01); *G06F 9/5072* (2013.01); *G06F 9/5083* (2013.01);
(Continued)

(58) Field of Classification Search
CPC . H04L 67/14; H04L 65/1083; H04L 65/1006; H04L 41/0806; H04L 43/08;
(Continued)

(56) References Cited

U.S. PATENT DOCUMENTS 7,328,281 B2 *   2/2008  Takeda .............. H04L 29/06027
                                                 370/338
8,868,739 B2 *  10/2014  Mallet .................... G06Q 50/01
                                                 709/224
(Continued)

FOREIGN PATENT DOCUMENTS

CN           104539558 A       4/2015

*Primary Examiner* — Mounir Moutaouakil
(74) *Attorney, Agent, or Firm* — Buchanan Ingersoll & Rooney PC (57) ABSTRACT

A computer-implemented method of managing tenants on a multi-tenant SIP server system has at least two multi-tenant enabled SIP server instances in an SIP server cloud or private datacenter environment. Each SIP server instance of the plurality of SIP server instances is configured as a virtual application. The method contains the steps of initially configuring a first tenant on a first SIP server instance, monitoring the capacity of the first SIP server instance, and monitoring the capacity of a second SIP server instance. The monitoring of the first and second SIP server instances is carried out by monitoring at least one predetermined capacity-relevant value. When the at least one predetermined capacity-relevant value exceeds a predetermined threshold value indicating that capacity resources are low on the first SIP server instance, then the first tenant is moved from the first SIP server instance to the second SIP server instance.

20 Claims, 4 Drawing Sheets

(51) Int. Cl.
*H04M 7/00* (2006.01)
*H04L 12/26* (2006.01)
*H04L 12/24* (2006.01)
*G06F 9/50* (2006.01)
*G06F 11/34* (2006.01)

(52) U.S. Cl.
CPC .......... *H04L 41/0806* (2013.01); *H04L 43/08* (2013.01); *H04L 65/1006* (2013.01); *H04L 65/1073* (2013.01); *H04L 65/1083* (2013.01); *H04L 65/1093* (2013.01); *H04M 7/006* (2013.01); *G06F 11/3433* (2013.01); *H04L 29/06197* (2013.01)

(58) Field of Classification Search
CPC ............. H04L 65/1073; H04L 65/1093; H04L 29/06197; H04L 67/1002; H04L 67/10; H04L 63/0815; G06F 9/5072; G06F 9/5083; G06F 11/3433; H04M 7/006
See application file for complete search history.

(56) References Cited

U.S. PATENT DOCUMENTS

| | | | | |
|---|---|---|---|---|
| 8,886,807 | B2* | 11/2014 | Nguyen | H04N 21/23103 709/226 |
| 9,071,459 | B2 | 6/2015 | Layman et al. | |
| 9,628,583 | B2* | 4/2017 | Fu | H04L 67/2814 |
| 9,847,942 | B2* | 12/2017 | Hilt | H04L 47/10 |
| 2002/0184376 | A1 | 12/2002 | Sternagle | |
| 2005/0233693 | A1* | 10/2005 | Karaoguz | H04H 20/57 455/3.06 |
| 2006/0242300 | A1* | 10/2006 | Yumoto | H04L 29/06027 709/226 |
| 2014/0019626 | A1 | 1/2014 | Hubler et al. | |
| 2014/0079207 | A1 | 3/2014 | Zhakov et al. | |
| 2014/0215031 | A1 | 7/2014 | Janssens et al. | |
| 2015/0373200 | A1* | 12/2015 | Zitnik | H04L 51/38 370/260 |

* cited by examiner

COMPUTER-IMPLEMENTED METHOD AND SYSTEM FOR MANAGING TENANTS ON A MULTI-TENANT SIP SERVER SYSTEM

CROSS-REFERENCE TO RELATED APPLICATION

Applicants claim the benefit of U.S. Provisional Patent Application Ser. No. 62/444,512 filed Jan. 10, 2017.

FIELD OF THE INVENTION

The present invention relates to a computer-implemented method of managing tenants on a multi-tenant SIP server system as well as to a corresponding multi-tenant SIP server system.

BACKGROUND OF THE INVENTION

Single tenant SIP (Session Initiation Protocol) server solutions, i.e., with only one SIP server instance being provided per tenant or company, are implemented in cloud infrastructures by means of virtualization technologies more and more. In such a single tenant constellation, the tenant may grow or shrink substantially, for example, because the number of users increases or decreases drastically, and, in order to optimize server resources, it may become necessary to move the single tenant SIP server software application by means of virtualization technologies (e.g., vMotion or the like) to another physical server which has higher capacities available.

However, with respect to multi-tenancy SIP server solutions in which one SIP server instance is configured to host a plurality of tenants rather than only one tenant, the scenario described above is rather difficult especially regarding cloud infrastructures for the reasons outlined below.

Moreover, tenants which may be regarded as an operational unit providing services to users of a customer consuming services may have different sizes, for example, ranging from 10 users to e.g. 400,000 users, which have to be supported. Also here, the tenant sizes may vary substantially over time and may also be regarded as a dynamically changing factor such that, as already has been noted with respect to single tenant SIP server solutions, problems with respect to server resources may occur.

If, for example, a company as an example for a tenant, grows and the number of users thus increases substantially so that resources of the SIP server instance on which this tenant resides are becoming scarce, it may be necessary to move tenants from one SIP server instance (for example, a first virtual machine) to another SIP server instance (for example, a second virtual machine) in order to enable optimal utilization of the physical server resources thereby allowing economical operation of such a cloud solution. However, in prior art it is known to move complete virtual machines (i.e., the entire SIP server instances with all tenants configured thereon) between servers which will not be sufficient for achieving the above mentioned aim of optimal utilization of server resources.

Load balancing solutions known in prior art are all rather complex and involve manual and thus expensive management intervention in order to move tenants of a multi-tenant SIP (e.g. VOIP—Voice over Internet Protocol) server system to another SIP server. Therefore, the present invention is based on the object to provide a computer-implemented method for managing more efficiently tenants on a multi-tenant SIP server system in cloud environments.

SUMMARY OF THE INVENTION

The problems described above are is solved according to the invention by a computer-implemented method of managing tenants on a multi-tenant SIP server system and by a multi-tenant SIP server system having the features according to the claims. Preferred embodiments of the invention are specified in the respective dependent claims.

Accordingly, a computer-implemented method of managing tenants on a multi-tenant SIP server system comprising at least two multi-tenant enabled SIP server instances in an SIP server cloud or private datacenter environment, wherein each SIP server instance of the plurality of SIP server instances is configured as a virtual application, the method comprising the steps of initially configuring a first tenant on a first SIP server instance, monitoring the capacity of the first SIP server instance and monitoring the capacity of a second SIP server instance, wherein the monitoring of the first and second SIP server instances is carried out by monitoring at least one predetermined capacity-relevant value. When the at least one predetermined capacity-relevant value exceeds a predetermined threshold value indicating that capacity resources are low on the first SIP server instance, then the first tenant is moved from the first SIP server instance to the second SIP server instance.

By the inventive method, the rigid and manual assignment (user provisioning) of SIP users of a tenant to one specific SIP server instance is resolved and it enables tenants to move detached from their original SIP server instance to another one according to available resources. Thereby, namely, on the basis of threshold monitoring, by moving single tenants and not the entire SIP server instance on which the tenants are configured originally or initially, resources and capacities on the SIP server instances may be optimized and used more efficiently. If adequate, the inventive method allows for reducing the number of required SIP servers accordingly or, in another scenario, allows for increasing the number of required SIP servers appropriately in an optimized manner. The resulting optimal overall server infrastructure utilization, in turn, reduces costs of the VoIP/SIP solution for the tenant (company).

It is noted that the capacity-relevant value is not a fixed value, but rather may be implemented according to various forms adapted to the specific requirements of the multi-tenant SIP server system. Further, the capacity-relevant value may be a parameter, a factor, a measure, or the like which is related to indicating the necessity for moving a tenant from a first SIP server instance to a second SIP server instance based on policies, as further outlined in detail and by means of specific examples below.

According to a preferred embodiment, at the stage of initial configuration, the first tenant has a first number of users. Further, the first tenant users may be provisioned at the first SIP server instance and the predetermined capacity-relevant value may be a capacity-relevant value of the first tenant and of the second tenant, in particular, a number of users.

Moreover, according to another preferred embodiment, the method further comprises a step of routing incoming SIP messages to either the first or the second SIP server instance depending on which one of the first or the second SIP server instance the tenant user at the time of receiving an incoming SIP message is provisioned and/or registered with. For example, in case of OpenScape Voice (OSV), a tenant is mapped to a business group with an associated numbering plan and routing table. Therefore, if call processing is monolithic, i.e., incoming and outgoing call parts are not separated, both parties of a business group actually must reside on the same SIP server, meaning that a business group may not span across more than one SIP server instance for local calls. For routing SIP calls to the correct SIP server instance with which the called SIP user is registered, locating the SIP server that currently hosts a tenant for a session initiation may be based on a central database look-up by a load distribution front-end node for session routing decisions. According to a further embodiment, the central database may also provide authentication and authorization.

Preferably, the step of moving the first tenant from the first SIP server instance to the second SIP server instance is triggered automatically. This avoids any manual steps and makes the method even more convenient and efficient.

Also, it is advantageous, if in the step of monitoring the at least one predetermined capacity-relevant value it is determined that the threshold value is exceeded, an indication is generated indicating that the first tenant has to be moved from the first SIP server instance to the second SIP server instance, the indication being sent to an administrator of the system.

According to still another embodiment, after the first tenant has been moved from the first SIP server instance to the second SIP server instance, tenant users of the first tenant are deleted from the first SIP server instance so as to make these resources which are no longer needed available again.

Moreover, it is also preferable if, after the first tenant has been moved from the first SIP server instance to the second SIP server instance, the tenant users register, in particular, by means of a SIP register message, at the second SIP server instance. This corresponds to an explicit (SIP) registration procedure. Alternatively, an implicit (SIP) registration procedure is possible according to which the entire registration data are moved together with the tenant from the first SIP server instance to the second SIP server instance. With registration procedure here, a SIP registration procedure is meant which takes place, when the SIP phone of the user logs in or the user logs in at its SIP softclient. In both cases, an SIP register message is resent, from which point of time the SIP user may be reached.

The method may further comprise an authentication step for authenticating tenant users of the tenant, the authentication step either being carried out in a central authentication instance, or at the SIP server instance at which the tenant is currently located.

Moreover, according to the present invention, a multi-tenant SIP server system with at least two multi-tenant enabled SIP server instances is provided, wherein each SIP server instance of the plurality of SIP server instances is configured as a virtual application, and wherein the multi-tenant SIP server system is adapted to carry out the method of managing tenants on a multi-tenant SIP server system as specified above. The multi-tenant SIP server system allows for efficient utilization of resources on a dynamic basis, as already outlined above with respect to the computer-implemented method of managing tenants on a multi-tenant SIP server system.

Preferably, the multi-tenant SIP server system comprises
a management system adapted to control a plurality of SIP server instances and to manage tenants of the SIP server instances;
a database comprising data of the tenants, in particular, phone numbers, URIs, authentication credentials, authorization information; and/or data on current assignments of tenants to SIP server instances; and/or data concerning the SIP server instances and their capacity parameters, in particular, vCPU, vRAM, vDISC, and the like; and
a policy service adapted to monitor the capacity of the SIP server instances by monitoring at least one predetermined capacity-relevant value,
wherein, when the at least one predetermined capacity-relevant value exceeds a predetermined threshold value indicating that capacity resources are low on a first SIP server instance, the policy service is adapted to move a first tenant which is configured and managed on the first SIP server instance to a second SIP server instance.

By providing the policy service for monitoring the capacity of the SIP server instances, policy based tenant management is enabled for multi-tenant SIP server solutions so that resources may be used according to current or changing requirements efficiently on the basis of policies. For example, the policy service may use as a measure or factor for moving a tenant to another SIP server instance either one or any combination of the capacity-relevant values listed below:

the load/utilization of the physical servers,
the load of the SIP server instances,
the current or maximum number of tenants on an SIP server instance,
the current or maximum number of users per tenant, threshold values,
threshold values according to which moving of a tenant is to be triggered (e.g., a predetermined percentage of the maximum number of users on an SIP server instance has been reached)
tenant growth/negative growth in relation to the number of current users,
tenant growth/negative growth in relation to the number of users over time (this may result in cycles, e.g., considering construction industry having growth in summer time and negative growth in winter time),
call rates and traffic statistics of the tenant users, business-hour call attempts (BHCA), business-hour completed calls (BHC), relevant market for the tenants (e.g., call center tenants produce substantially more traffic than tenants with user going after regular office work or the like),
seasonal features (for example, tenants belonging to tourism industry produce higher traffic during vacation booking phases),
using features and other aspects having an impact on capacities of server resources and/or bandwidth resources (e.g. audio/video/data Codecs used, Codec Conversion, voice encryption, video encryption, video calls with respect to resolution, conference calls, etc.)
co-location requirements (e.g., if two tenants/companies migrate, these two tenants should run on one SIP server instance or at least on a physical server, or at least in the same server pool of a data center, or at least in the same data center, etc.),
geo-location requirements (requirements to use the service (VoIP/SIP, or the like) from another alternative data center),
bandwidth usage/requirements (there has to be sufficient bandwidth between the hosting data center and the location of the tenant; moving of tenants and other changes are taken into consideration).

Still further measures, parameters, or factors in addition to the ones listed above which are useful as an indicator for the point of time of moving a tenant from one SIP server instance to another are conceivable.

According to another preferred embodiment, the policy service further is adapted to determine the point of time for moving the first tenant from the first SIP server instance to the second SIP server instance. For example, monitoring the first and second SIP server instance may reveal the necessity for moving a tenant from the first SIP server instance to the second SIP server instance. However, at the point of time of determining the necessity of a move, it may not be most convenient, but rather it would be more convenient to execute the move and all measures involved therewith at another point of time. For example, in some situations it may be more convenient to initiate a move at nighttime at which only few or even no calls are being made. Thus, the policy service according to an embodiment will determine the most convenient point of time for executing the move of a tenant from a first multi-tenant SIP server to a second multi-tenant SIP server.

Further, the determination of the point of time for moving the first tenant may be based on at least one of the following parameters
- the usage of the SIP server instances;
- the maximum number of tenants on each one of the SIP server instances;
- the maximum number of users per tenant; and/or
- a threshold value for triggering moving the first tenant from the first SIP server instance to the second SIP server instance.

According to yet another preferred embodiment, the multi-tenant SIP server system further comprises a routing information service being provided as a central instance in the multi-tenant SIP server system, and being configured to route incoming SIP messages for a respective tenant to the respective SIP server instance, at which the respective tenant is currently located. The routing decision service or routing information service thus is decoupled from the SIP server instances and allows incoming SIP messages (e.g., SIP INVITE) to query at the central instance the SIP Call Routing Decisions at the correct SIP server instance. The multi-tenant SIP server may also comprise a central authentication instance.

According to another preferred embodiment, the management system is adapted to trigger moving the first tenant from the first SIP server instance to the second SIP server instance automatically.

Further advantages, features and characteristics of the invention will become apparent from the subsequent description of preferred embodiments with reference to the drawings.

DESCRIPTION OF PRESENT PREFERRED EMBODIMENTS

Figure 1:
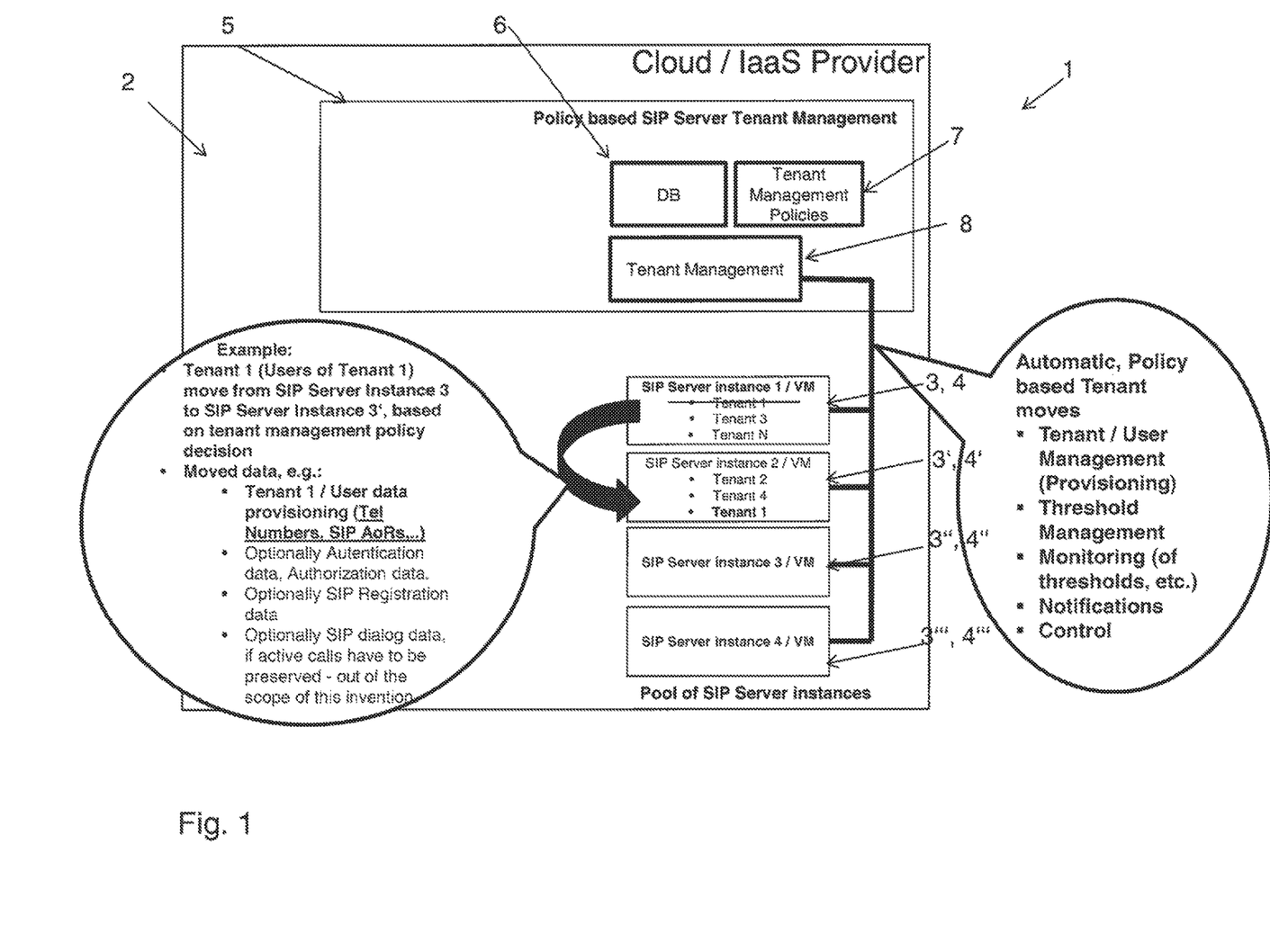
FIG. 1 is a schematic illustration of a multi-tenant SIP server solution in a cloud.

FIG. 1 is a schematic illustration of a multi-tenant SIP server solution in a cloud indicated by reference numeral 1 which is provided, for example, by an Infrastructure as a Service (IaaS) provider. In the cloud 1, a SIP server system 2 is provided comprising a number of SIP server instances 3, 3', 3", 3'". In the embodiment shown here, the SIP server instance 3 corresponds to a first SIP server instance, the SIP server instance 3' corresponds to a second SIP server instance, the SIP server instance 3" corresponds to a third SIP server instance, and the SIP server instance 3'" corresponds to a fourth SIP server instance. Thus, in this embodiment shown here, four SIP server instances 3, 3', 3", 3'" are implemented in the cloud 1 on a physical server having virtualization infrastructure. Each one of the four SIP server instances 3, 3', 3", 3'" is respectively placed in a virtual machine 4, 4', 4", 4'", and further, each one of the four SIP server instances 3, 3', 3", 3'" comprises a number of users which may vary from tenant to tenant. For example, an SIP server product may support 200,000 users per OSV at the maximum. However, another SIP server instance may only support 100,000 users or less. As mentioned above, the number of users per tenant may vary over time depending on various factors which constitute capacity-relevant values and which have been listed above, but some examples of which are:
- the load/utilization of the physical servers,
- the load of the SIP server instances,
- the current or maximum number of tenants on an SIP server instance,
- the current or maximum number of users per tenant, threshold values,
- threshold values according to which moving of a tenant is to be triggered (e.g., a predetermined percentage of the maximum number of users on an SIP server instance has been reached),
- tenant growth/negative growth in relation to the number of current users,
- tenant growth/negative growth in relation to the number of users over time (this may result in cycles, e.g., considering construction industry having growth in summer time and negative growth in winter time),
- call rates and traffic statistics of the tenant users, business-hour call attempts (BHCA), business-hour completed calls (BHC), relevant market for the tenants (e.g., call center tenants produce substantially more traffic than tenants with user going after regular office work or the like),
- seasonal features (for example, tenants belonging to tourism industry produce higher traffic during vacation booking phases),
- using features and other aspects having an impact on capacities of server resources and/or bandwidth resources (e.g. audio/video/data Codecs used, Codec Conversion, voice encryption, video encryption, video calls with respect to resolution, conference calls, etc.),
- co-location requirements (e.g., if two tenants/companies migrate, these two tenants should run on one SIP server instance or at least on a physical server, or at least in the same server poos of a data center, or at least in the same data center, etc.),
- geo-location requirements (requirements to use the service (VoIP/SIP, or the like) from another alternative data center), and
- bandwidth usage/requirements (there has to be sufficient bandwidth between the hosting data center and the location of the tenant; moving of tenants and other changes are taken into consideration).

The multi-tenant SIP server system 2 further comprises a policy-based SIP server tenant management 5 comprising a database 6, a tenant management policies unit 7, and a tenant management unit 8. In the database, tenants and their users, as phone numbers, URIs, authentication credentials, authorization/permissions/feature authorization, etc. are stored as well as the current assignment of tenants and their users to the different SIP server instances 3, 3', 3", 3"'. Further, the SIP server instances 3, 3', 3", 3"' with their corresponding capacity parameters (e.g. vCPU, vRAM, vDISC) and the like are also be stored in the database 6.

The policy service or tenant management policies unit 7 comprises the above listed capacity-relevant values which may constitute a predetermined threshold value which is monitored for moving a tenant from a first server instance 3 to a second server instance 3' when the predetermined threshold value is reached, indicating that resources on the first server instance 3 are becoming too low.

Further, the tenant management unit 8 is provided in the SIP server tenant management 5 for user management and provisioning, threshold management, monitoring of the SIP server instances 3, 3', 3", 3"', sending notifications, and controlling the SIP server instances 3, 3', 3", 3"'.

Referring back to the four SIP server instances 3, 3', 3", 3"'/virtual machines 4, 4', 4", 4"', in the embodiment shown here, before relocation of any tenants, tenant 1 and tenant 3 are located on the first SIP server instance 3, whereas tenant 2 and tenant 4 are located on the second SIP server instance 3'. Thus, when it is determined for a specific tenant, e.g. tenant 1, on the basis of a capacity-relevant that a predetermined threshold value is reached indicating that the capacity of the first SIP server instance 3 is exhausted, and for another SIP server instance, for example, for the second SIP server instance 3' it is determined that capacities are available, for example, on the basis of monitoring another capacity-relevant value, then tenant 1 will be moved from the first server instance 3 to the second server instance 3' based on a tenant management policy decision of the tenant management policies unit 7.

Upon the above mentioned tenant management policy decision, also authentication data, authorization data, SIP registration data, SIP dialog data (e.g., if calls have to be preserved) may be moved together with tenant 1 from the first SIP server instance 3 to the second SIP server instance 3'. Moving tenant 1 from the first SIP server instance 3 to the second server instance 3' results in an efficient use of resources within the multi-tenant SIP server system 2.

It is noted that the SIP server management 5 can also be implemented to move only some of the users of a specific tenant, e.g. tenant 1, from one SIP server instance to another SIP server instance, if appropriate according to monitoring and determination procedure outlined above. This may be useful in a case, according to which, for example, tenant 1 has users in Europe as well as in the United States of America. In such a case, United States users may be relocated or moved to an SIP server instance in the USA. Also, the policy based SIP server tenant management 5 may move one tenant to another tenant, for example, it may move tenant 1 to tenant 2, irrespective on which SIP server instance tenant 2 is located. This may be useful in a case in which users of a first company have to be moved to another company, for example, when a part of the company or the entire company has been absorbed by another firm.

Figure 2:
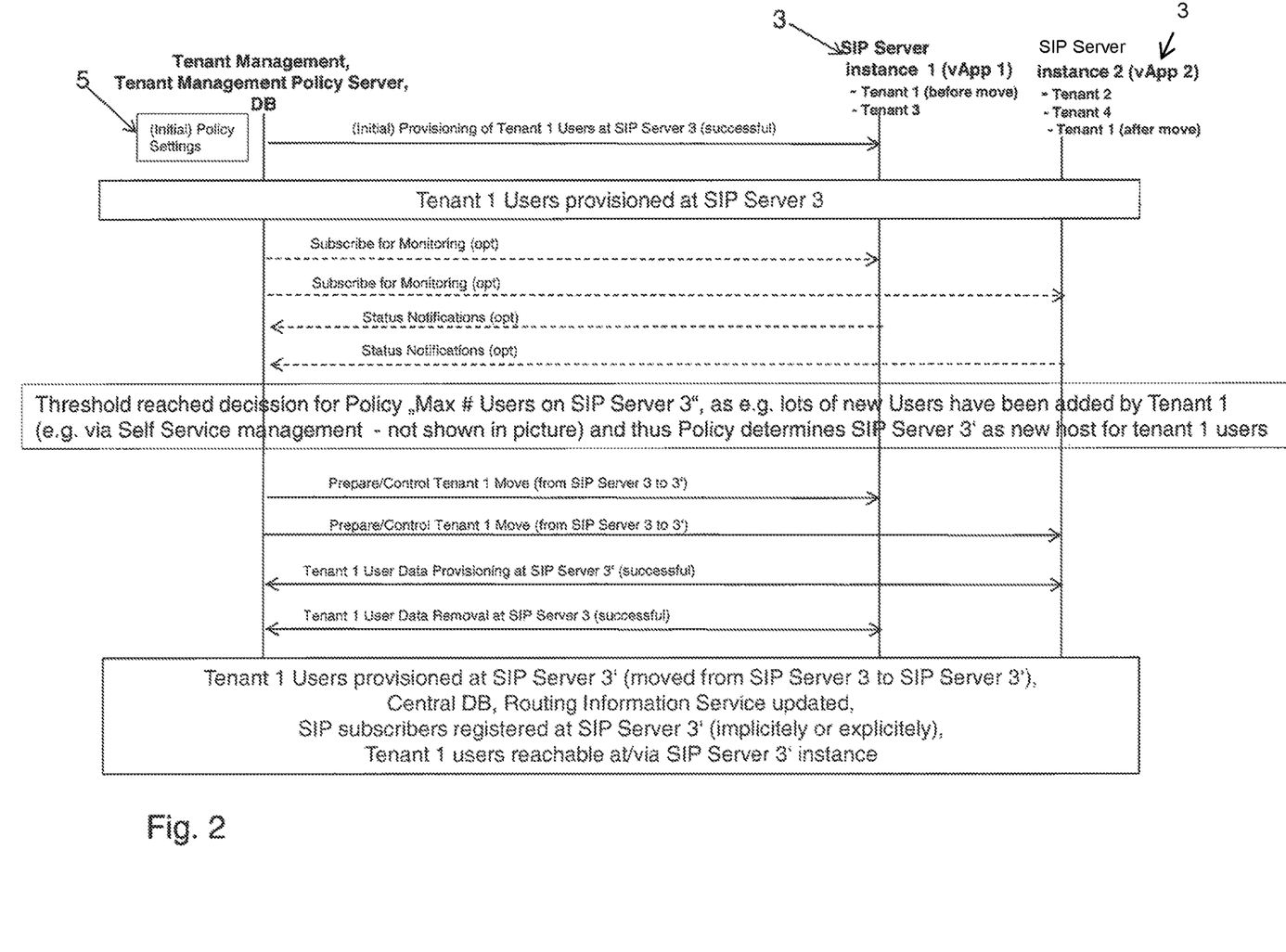
FIG. 2 is a schematic illustration for explaining moving of a tenant on the management plane.

FIG. 2 is a schematic illustration for explaining the moving procedure of a tenant, namely, of tenant 1 initially located on the first SIP server instance 3 (and virtual application vApp 4) to the second SIP server instance 3' (and vApp 4'), on the management plane, namely, by the SIP server tenant management 5. As already described with respect to FIG. 1, on the first SIP server instance 3, tenant 1 and tenant 3 are located initially, whereas tenant 2 and tenant 4 are located on the second SIP server instance 3'. Thus, according to the initial policy settings, the users of tenant 1 initially are provisioned at the first SIP server instance 3. Both, the first SIP server instance 3 and the second SIP server instance 3' subscribe for monitoring of a capacity-relevant value and, in turn, respectively send status notifications to the SIP server tenant management 5. In this case, the capacity-relevant value is the number of users. If a maximum number of users, i.e., a corresponding threshold value, is reached, since tenant 1 has grown substantially, then the tenant management policy unit 7 decides that tenant 1 has to move from the first SIP server instance 3 to the second SIP server instance 3'. At the same time, it has to be determined that the second SIP server instance 3' has corresponding capacities available.

Then, both the first server instance 3 and the second server instance 3' are prepared and controlled so as to move tenant 1 accordingly from the first server instance 3 to the second server instance 3'. Thereafter, user data provisioning of tenant 1 is carried out at the second SIP server 3' and notified accordingly to the SIP server tenant management 5. After this step, user data of tenant 1 are removed from the first SIP server 3 which also is notified to the SIP server tenant management 5 accordingly. Eventually, tenant 1 users are provisioned at the second SIP server instance 3' after having been moved from the first SIP server instance 3 to the second SIP server instance 3', SIP subscribers are registered at the second SIP server instance 3' either explicitly or implicitly, as explained above, and from that point of time on, tenant 1 users are reachable via the second SIP server instance 3'.

Figure 3:
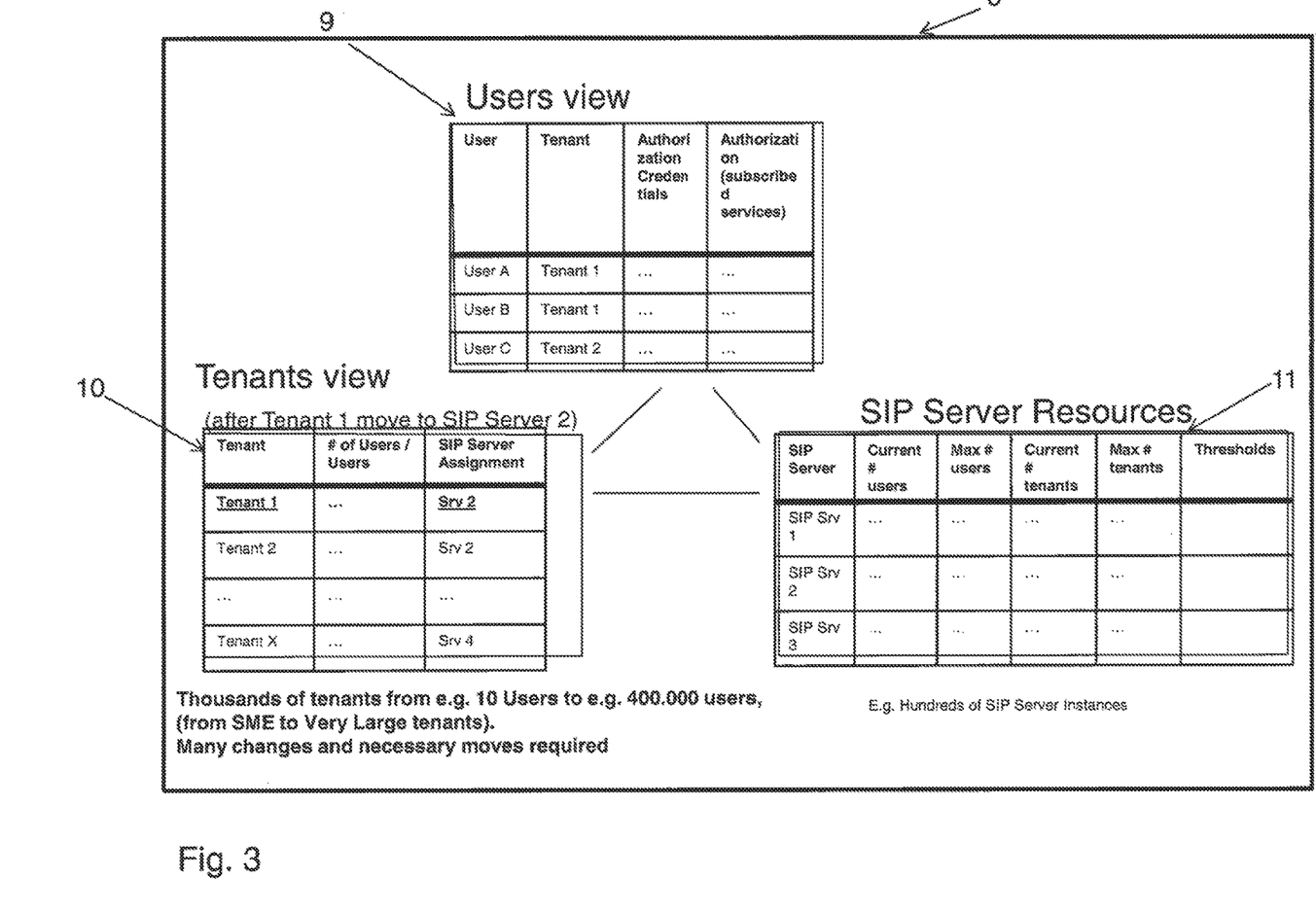
FIG. 3 is an example of a database implemented in a multi-tenant SIP server system according to an embodiment.

FIG. 3 is an embodiment of a database 6 implemented in a multi-tenant SIP server system 2 as described with respect to FIG. 1. Here, there are provided three correlating tables 9, 10, and 11, wherein in a first table 9 corresponding to a users' view, users A, B, and C are listed and assigned to the respective tenants, like tenant 1 or tenant 2. Also, the users are assigned to authorization credentials and authorization to subscribed services. In a second table 10 corresponding to a tenants' view after tenant 1 has moved from the first SIP server 3 to the second SIP server 3', tenants and their corresponding number of users are assigned to respective SIP servers. Here, for example, tenant 1 is assigned to the second SIP server 3', tenant 2 is assigned to the second SIP server 3', and tenant X is assigned to a fourth SIP server 3"'.

The third table 11 relates to SIP server resources, wherein SIP servers, as the first SIP server 3, the second SIP server 3', and the third SIP server 3" are related to their respective current number of users, the maximum number of users, their respective current number of tenants, the maximum number of tenants, and the predetermined thresholds.

It is noted that according to the above described configuration, thousands of tenants may be located in the multi-tenant SIP server system with a number of users ranging from, e.g., 10 users to 400,000 users corresponding to small enterprises up to very large tenants, and for example hundreds of SIP server instances 3, 3', . . . N"'. Thus, many changes and continuous rearrangement or moving of tenants may be required in such systems.

Figure 4:
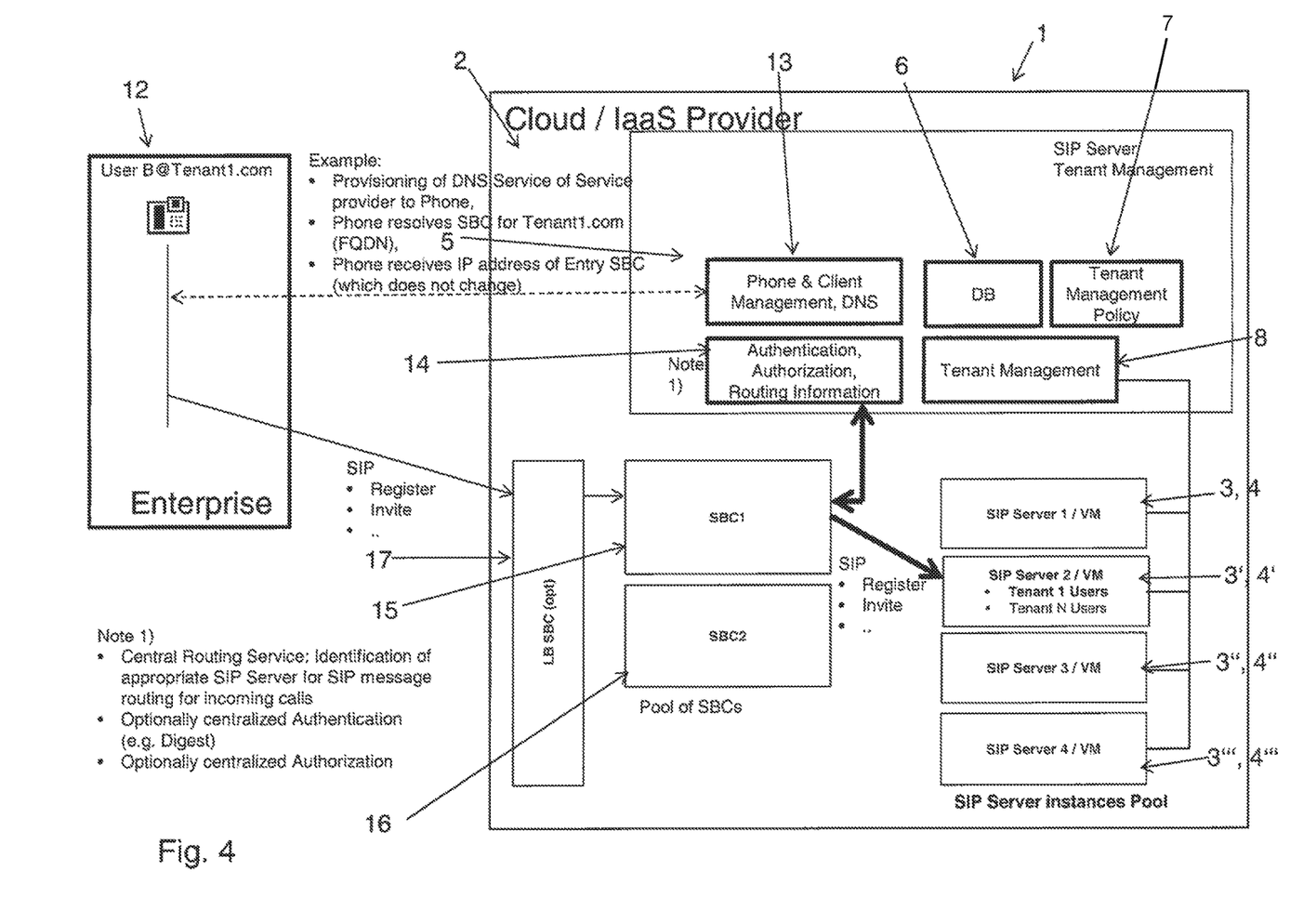
FIG. 4 is a diagram illustrating an SIP call flow example after a tenant has been moved according to an embodiment of the computer-implemented method of managing tenants on a multi-tenant SIP server system.

FIG. 4 illustrates an SIP call flow example after a tenant has been moved according to an embodiment of the computer-implemented method of managing tenants on a multi-tenant SIP server system. Here, tenant 1 is an enterprise with a number of users where the illustrated phone stands for a user B indicated by reference numeral 12 who can be reached via tenant 1 (B@Tenant1.com). The SIP server tenant management 5 comprises the database 6, the tenant management policy unit 7, the tenant management unit 8, the phone & client management and Domain Name Server DNS 13, and the authentication, authorization, and routing information unit 14. With respect to the authentication, authorization, and routing information unit 14 it is noted that the central routing service provides identification of the appropriate SIP server for SIP message routing for incoming calls. According to a further embodiment, the authentication may be centralized as well as the authorization.

Moreover, in the multi-tenant SIP server system 2, there is provided first Session Border Controller (SBC) 15 and a second Session Border Controller (SBC) 16 which are contained in a pool of SBCs. Further, a Load Balancer LB SBC 17 is provided. In this embodiment, as indicated by the dotted arrow connecting users of tenant 1 with the phone & client management, DNS unit 13, provisioning of DNS service of the service provider to the user or phone 12 is carried out first, then the phone 12 resolves SBC for tenant1.com (FQDN), and then, the phone 12 receives the IP address of entry SBC. As indicated by the lower arrow, SIP call signaling protocol messages such as register, invite, and the like in this configuration is carried out at the LB SBC 17, SBC 15 or 16 and the Authentication, Authorization and Routing Information Service 14, to finally enable incoming SIP message routing to the appropriate SIP Server Instance. The appropriate SIP Server instance for an incoming SIP (Re)-Register message from tenant 1 user phone 12 is the SIP Server instance 3' on which tenant 1 users (and thus also phone 12) are currently provisioned. The appropriate SIP Server instance for an incoming SIP Invite message from another User X, calling tenant 1 user B (phone 12) also is the SIP Server instance 3' on which the called user B (tenant 1) is currently provisioned and registered.

The invention claimed is:

1. A computer-implemented method of managing tenants on a multi-tenant Session Initiation Protocol (SIP) server system comprising at least two multi-tenant enabled SIP server instances in an SIP server cloud or private datacenter environment, wherein each SIP server instance of the plurality of SIP server instances is configured as a virtual application, the method comprising:
   initially configuring a first tenant and users of the first tenant on a first SIP server instance,
   monitoring a capacity of the first SIP server instance, and monitoring a capacity of a second SIP server instance, wherein the monitoring of the first and second SIP server instances is carried out by monitoring at least one predetermined capacity-relevant value,
   upon a determination that the at least one predetermined capacity-relevant value exceeds a predetermined threshold value indicating that capacity resources are low on the first SIP server instance, determining that the first tenant should be moved from the first SIP server instance to the second SIP server instance;
   in response to determining that the first tenant should be moved from the first SIP server instance to the second SIP server instance, determining a moving time at which to move the first tenant from the first SIP server instance to the second SIP server instance based on expected usage of the first SIP server instance within a period of time and expected usage of the second SIP server instance within the period of time to select the moving time at which a minimal usage of the first SIP server instance and a minimal usage of the second SIP server instance is expected; and
   moving the first tenant from the first SIP server instance to the second SIP server instance at the determined moving time.

2. The method according to claim 1, wherein the first tenant has a first number of users at initial configuration, wherein the users of the first tenant are provisioned at the first SIP server instance, and wherein the at least one predetermined capacity-relevant value is a capacity-relevant value of a number of the users of the first tenant and a number of users of a second tenant.

3. The method according to claim 1, the method further comprising a step of routing incoming SIP messages to either the first SIP server instance or the second SIP server instance depending on which one of the first SIP server instance or the second SIP server instance the users of the first tenant is provisioned and/or registered at a time of receiving an incoming SIP message.

4. The method according to claim 1, wherein moving the first tenant from the first SIP server instance to the second SIP server instance is triggered automatically.

5. The method according to claim 1, wherein, when in the step of monitoring the at least one predetermined capacity-relevant value it is determined that the threshold value is exceeded, an indication is generated indicating that the first tenant must be moved from the first SIP server instance to the second SIP server instance, the indication being sent to an administrator.

6. The method according to claim 1, comprising:
   deleting the users of the first tenant from the first SIP server instance after the first tenant has been moved from the first SIP server instance to the second SIP server instance.

7. The method according to claim 6, wherein the method comprises:
   registering the users of the first tenant at the second SIP server instance via at least one SIP register message after the first tenant has been moved from the first SIP server instance to the second SIP server instance.

8. The method according to claim 6, wherein the moving of the first tenant includes moving of registration data together with the first tenant from the first server instance to the second server instance.

9. The method according to claim 1, further comprising an authentication step for authenticating users of the first tenant, the authentication step being carried out in one of a central authentication instance and the SIP server instance at which the first tenant is currently located.

10. A multi-tenant Session Initiation Protocol (SIP) server system comprising:
    at least two multi-tenant enabled SIP server instances comprising a first SIP server instance communicatively connectable to a second SIP server instance for moving of a first tenant from a first SIP server instance to the second SIP server instance;
    the SIP server instance system configured to:
       initially configure a first tenant and users of the first tenant on the first SIP server instance,
       monitor a capacity of the first SIP server instance,
       monitor a capacity of the second SIP server instance, wherein monitoring of the first and second SIP server instances is carried out by monitoring at least one predetermined capacity-relevant value,
       determine that the first tenant should be moved from the first SIP server instance to the second SIP server instance upon a determination that the at least one predetermined capacity-relevant value exceeds a predetermined threshold value indicating that capacity resources are low on the first SIP server instance,
determine a moving time at which to move the first tenant from the first SIP server instance to the second SIP server instance based on expected usage of the first SIP server instance within a period of time and expected usage of the second SIP server instance within the period of time to select the moving time at which a minimal usage of the first SIP server instance and a minimal usage of the second SIP server instance is expected; and
move the first tenant from the first SIP server instance to the second SIP server instance at the determined moving time.

11. The method of claim 1, wherein the determining of the moving time is based on at least two of:
usage of the SIP server instances;
a maximum number of tenants on each one of the SIP server instances;
a maximum number of users per tenant; and
a threshold value for triggering moving of the first tenant from the first SIP server instance to the second SIP server instance.

12. The method of claim 1, wherein the determining of the moving time is based on:
usage of the SIP server instances;
a maximum number of tenants on each one of the SIP server instances;
a maximum number of users per tenant; and
a threshold value for triggering moving of the first tenant from the first SIP server instance to the second SIP server instance.

13. The multi-tenant SIP server system according to claim 10, the system comprising:
a management system adapted to control the SIP server instances and to manage tenants of the SIP server instances;
a database comprising data of the tenants selected from the group consisting of phone numbers, URIs, authentication credentials, authorization information; data on current assignments of tenants to SIP server instances; and data concerning the SIP server instances and their capacity parameters; and
a policy service adapted to monitor the capacity of the SIP server instances by monitoring at least one predetermined capacity-relevant value;
wherein, when the at least one predetermined capacity-relevant value exceeds a predetermined threshold value indicating that capacity resources are low on a first SIP server instance, the policy service is adapted to facilitate the move of the first tenant from the first SIP server instance to the second SIP server.

14. The multi-tenant SIP server system according to claim 13, wherein the capacity parameters are vCPU, vRAM and/or vDISC.

15. The multi-tenant SIP server system according to claim 13, the policy service further being adapted to determine the moving time for moving the first tenant from the first SIP server instance to the second SIP server instance.

16. The multi-tenant SIP server system according to claim 15, wherein the determination of the moving time is based on at least three of the following parameters:
usage of the SIP server instances;
a maximum number of tenants on each one of the SIP server instances;
a maximum number of users per tenant; and
a threshold value for triggering moving the first tenant from the first SIP server instance to the second SIP server instance.

17. The multi-tenant SIP server system according to claim 10, the multi-tenant SIP server system further comprising a routing information service being provided as a central instance in the multi-tenant SIP server system, and being configured to route incoming SIP messages for a respective tenant to the respective SIP server instance, at which the respective tenant is currently located.

18. The multi-tenant SIP server system according to claim 10, further comprising a central authentication instance connectable to the first SIP server instance and the second SIP server instance.

19. The multi-tenant SIP server system according to claim 10, wherein the system is configured so that the move of the first tenant from the first SIP server instance to the second SIP server instance is triggered automatically.

20. The multi-tenant SIP server system according to claim 10, wherein the moving time is determined based on:
usage of the SIP server instances;
a maximum number of tenants on each one of the SIP server instances;
a maximum number of users per tenant; and
a threshold value for triggering moving of the first tenant from the first SIP server instance to the second SIP server instance.

* * * * *